United States Patent
Mahmoudi et al.

(10) Patent No.: US 9,641,073 B2
(45) Date of Patent: May 2, 2017

(54) START UP METHOD FOR SWITCHING CONVERTERS USING THE SAME REFERENCE VOLTAGE IN THE ERROR AMPLIFIER AND PWM COMPARATOR

(71) Applicant: QUALCOMM Incorporated, San Diego, CA (US)

(72) Inventors: Farsheed Mahmoudi, San Diego, CA (US); James Thomas Doyle, Carlsbad, CA (US); Amirali Shayan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/845,809

(22) Filed: Sep. 4, 2015

(65) Prior Publication Data

US 2017/0070141 A1 Mar. 9, 2017

(51) Int. Cl.
*H02M 3/157* (2006.01)
*H02M 1/00* (2006.01)

(52) U.S. Cl.
CPC .... *H02M 3/157* (2013.01); *H02M 2001/0003* (2013.01); *H02M 2001/0025* (2013.01)

(58) Field of Classification Search
CPC . H02M 2001/0003; H02M 2001/0025; H02M 3/156–3/1588
See application file for complete search history.

(56) References Cited

U.S. PATENT DOCUMENTS

| | | | | |
|---|---|---|---|---|
| 3,852,731 A | * | 12/1974 | Hollands | H02H 3/24 327/100 |
| 4,564,821 A | * | 1/1986 | Reichart | G01R 19/1658 327/50 |
| 5,663,989 A | * | 9/1997 | Fobbester | H03J 7/02 375/316 |
| 6,275,544 B1 | * | 8/2001 | Aiello | H04B 1/7183 375/226 |
| 6,377,480 B1 | | 4/2002 | Sase et al. | |
| 6,930,526 B1 | | 8/2005 | Silva | |
| 7,755,341 B2 | | 7/2010 | Philbrick et al. | |
| 8,085,562 B2 | | 12/2011 | Sisson | |
| 2003/0222633 A1 | | 12/2003 | Hwang | |
| 2007/0040536 A1 | * | 2/2007 | Smith, Jr. | H02M 3/157 323/280 |
| 2008/0246448 A1 | | 10/2008 | Chiu | |
| 2009/0267580 A1 | * | 10/2009 | Derksen | H02M 3/158 323/282 |
| 2015/0022165 A1 | * | 1/2015 | Sato | H02M 3/156 323/271 |
| 2015/0042299 A1 | | 2/2015 | Li | |

OTHER PUBLICATIONS

International Search Report and Written Opinion—PCT/US2016/043748—ISA/EPO—Dec. 1, 2016.

* cited by examiner

*Primary Examiner* — Harry Behm
*Assistant Examiner* — Peter Novak
(74) *Attorney, Agent, or Firm* — Haynes and Boone, LLP

(57) ABSTRACT

A switch-mode power supply is provided that includes a comparator for producing a pulse-width modulated (PWM) controller clock signal for controlling a power switch in the switch-mode power supply. The switch-mode power supply is configured to superimpose a DC-free version of a ramp voltage with an error voltage to produce a combined voltage. The comparator compares the combined voltage to a reference voltage to produce the PWM controller clock signal.

20 Claims, 5 Drawing Sheets

START UP METHOD FOR SWITCHING CONVERTERS USING THE SAME REFERENCE VOLTAGE IN THE ERROR AMPLIFIER AND PWM COMPARATOR

TECHNICAL FIELD

This application relates to switch-mode power supplies, and more particularly to a guaranteed closed-loop startup for a switch-mode power supply.

BACKGROUND

To regulate the power rails on an integrated circuit such as a system-on-a-chip (SoC), it is conventional to use a switch-mode power supply (SMPS) due to its desirable efficiency as compared to alternative techniques such as a linear dropout regulator (LDO). To control the power switch cycling in an SMPS, it is also conventional to use a pulse-width modulation mode (PWM) controller due to its low-power consumption and greatly reduced complexity as compared to digital control schemes. Although PWM controllers are power efficient as compared to digital control schemes, the resulting feedback control loop suffers from startup problems.

To provide a better appreciation of these startup problems, consider a conventional switch-mode power supply 100 as illustrated in FIG. 1. A power switch 105 is cycled on and off with a duty cycle (pulse width) determined by a comparator 110. An input current is driven through power storage element 115 responsive to the input voltage while power switch 105 is conducting to store energy within power storage element 115. Power switch 105 is thus configured to control a current within power storage element 115. When power switch 105 switches off, the stored energy in power storage element 115 drives a load (not illustrated) with an output voltage Vout. A voltage scaling circuit 125 scales the output voltage to produce a scaled regulator output voltage that is compared to a reference voltage at an error amplifier 120 to produce an error voltage (error amplifier voltage signal). A digital-to-analog (DAC) converter 130 produces the reference voltage responsive to a band gap voltage (which may also be designated as a band gap reference or a band gap reference voltage) and a digital control signal.

The pulse-width modulation involves a ramp voltage generated by a ramp generator 135 at a ramp output signal node. The ramp voltage generation may be responsive to a clock signal such as a system clock signal. Comparator 110 compares the ramp voltage to the error voltage. As the scaled regulator output voltage changes in response to changes in the output voltage, an error voltage intersection with the ramp voltage changes accordingly. Comparator 110 will thus adjust the duty cycle of the cycling of power switch 105 so that the output voltage is regulated at the desired level. This desired amplitude for the output voltage is determined by the digital control signal (digital control word) controlling the reference voltage level at DAC 130.

Although such regulation of the output voltage in a switch-mode power supply is routine, note that the output voltage of error amplifier 120 will either be the power supply voltage VDD or ground upon startup as shown in FIG. 2A (a DC value for the ramp voltage as shown in FIG. 2A is discussed further herein). But to produce a pulsing of power switch 105, the error voltage (Verror, which may also be denoted as an error signal) must intersect with the ramp voltage (Vramp) as shown in FIG. 2B. In other words, the error voltage must have a value that lies between the maximum and minimum values of the ramp voltage. Since there is no such intersection in FIG. 2A, switch-mode power supply 100 would never go into regulation at startup with no further modifications. To address this startup issue, it is thus conventional to force power switch 105 to cycle upon startup in an open loop fashion (no feedback control through error amplifier 120 and comparator 110) and to then gradually increase the duty cycle of the power switch cycling so that the resulting error voltage has a value that lies between the maximum and minimum values for the ramp voltage. The loop is then closed so that the output voltage may be regulated in a conventional fashion. But this opening and closing of the control loop at startup of switch-mode power supply 100 results in delay and requires complicated circuitry to ensure a smooth transition into closed-loop operation.

Accordingly, there is a need in the art for pulse-width-modulated switch-mode power supplies having improved startup performance.

SUMMARY

A switch-mode power supply is provided that includes an error amplifier configured to amplify a difference between a scaled version of an output voltage for the switch-mode power supply to a reference voltage to provide an error voltage. The switch-mode power supply includes a ramp generator for forming a ramp voltage. The switch-mode power supply is configured to combine a DC-free version of the ramp voltage with the error voltage to produce a combined voltage. A comparator compares the combined voltage with the reference voltage to produce a pulse-width modulated (PWM) controller clock signal that controls the cycling of a power switch in the switch-mode power supply.

The resulting switch-mode power supply is quite advantageous in that the feedback loop through the error amplifier and the comparator with regard to regulating an output voltage produced responsive to the cycling of the power switch is closed upon startup. In contrast, conventional PWM-controlled switch-mode power supplies require complicated startup schemes in which the feedback loop is opened at startup and then closed, which results in substantial delay and power loss. The switch-mode power supply disclosed herein thus quickly achieves rapid regulation of the output voltage upon startup in contrast to conventional architectures.

These and additional advantageous features may be better appreciated with regard to the following detailed description of example embodiments.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

A switch-mode power supply is provided that addresses the startup problems associated with conventional pulse-width modulated (PWM) switch-mode power supplies. In this improved switch-mode power supply, a direct-current (DC)-free version of the ramp voltage is added to the error voltage to produce a combined (error and ramp) voltage. The comparator compares the combined voltage to a reference voltage to produce the controller output voltage that controls the power switch in the switch-mode power supply. This addition of the DC-free version of the ramp voltage to the error voltage requires relatively few components yet eliminates the need for any open loop operation. This is quite advantageous in that the time from startup to stable regulation of the output voltage from a power storage element in the switch-mode power supply is greatly reduced as compared to the conventional PWM switch-mode power supplies. Moreover, this increase in speed is achieved with remarkably fewer components as compared to the complex loop closing schemes in the prior art. These advantageous features may be better appreciated through a consideration of the following example embodiments.

Figure 3:
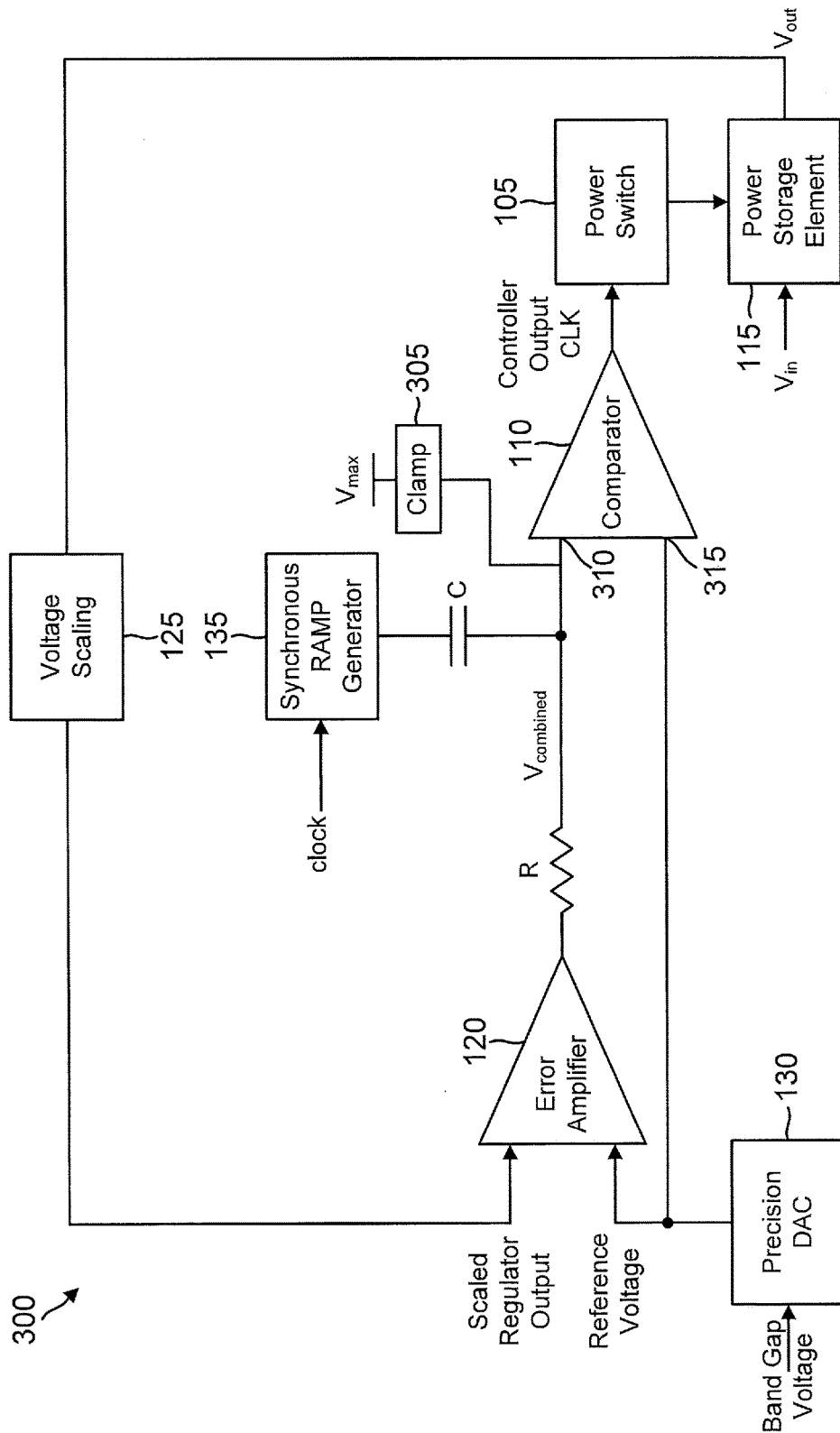
FIG. 3 is a schematic diagram of a switch-mode power supply in accordance with an embodiment of the disclosure.

A switch-mode power supply 300 shown in FIG. 3 is configured to startup in closed-loop control without any of the open-loop startup complications discussed with regard to the prior art. As used herein, the term "closed-loop" refers to the sampling of the output voltage and using the sampled output voltage through feedback to control the pulse width or duty cycle of the power switch in a switch-mode power supply. In contrast, an open loop control of the power switch does not use any feedback control. Advantageously, the closed-loop control upon startup for switch-mode power supply 300 is achieved using substantially the same components as discussed with regard to conventional switch-mode power supply 100. In that regard, switch-mode power supply 300 includes a comparator 110 that produces a PWM controller output clock to control the cycling of a power switch 105. Power switch 105 may comprise one or more transistors (not illustrated) such as metal oxide field effect transistors (MOSFETs). When power switch 105 is cycled on (power switch 105 being closed), a current is driven through a power storage element 115 responsive to an input voltage Vin to store energy within power storage element 115. For example, power storage element 115 may comprise an inductor such as used in a buck converter or a boost converter architecture. In alternative embodiments, power storage element 115 may comprise a secondary winding of a transformer as used in a flyback converter architecture. When power switch 105 is opened (cycled off), the stored energy in power storage element 115 is delivered to a load (not illustrated) through the regulated output voltage Vout.

After scaling through a voltage scaling circuit 125 (e.g., a voltage divider circuit), a scaled version of the regulated output voltage is received at an error amplifier 120. Error amplifier 120 amplifies the difference between a reference voltage from a digital-to-analog converter (DAC) 130 to produce an error voltage (Verror). DAC 130 converts a digital control signal into the analog reference voltage. DAC 130 is powered by a source reference voltage such as a bandgap voltage from a bandgap reference circuit (not illustrated). Depending upon the value of the digital control signal, the reference voltage thus equals some fraction of the bandgap reference voltage. The granularity of DAC 130 determines the granularity in the possible values for the resulting regulated output voltage from switch-mode power supply 300. In switch-mode power supply 300, the digital control signal may be 6-bits wide but it will be appreciated that the digital control signal (and hence the granularity in DAC 13) may have a larger or smaller width in alternative embodiments.

Figure 1:
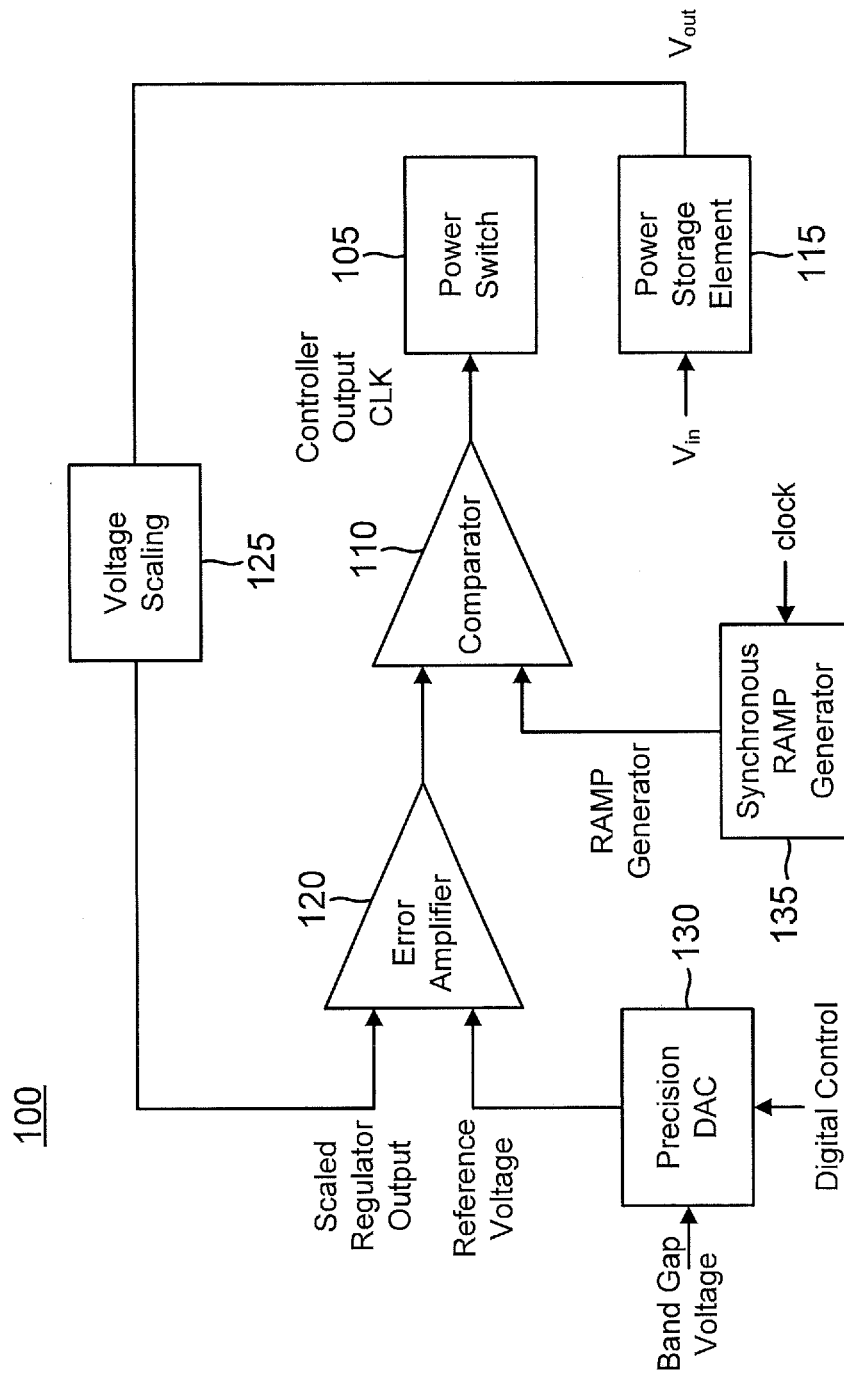
FIG. 1 is a diagram of a conventional PWM-controlled switch-mode power supply.
Figure 2A:
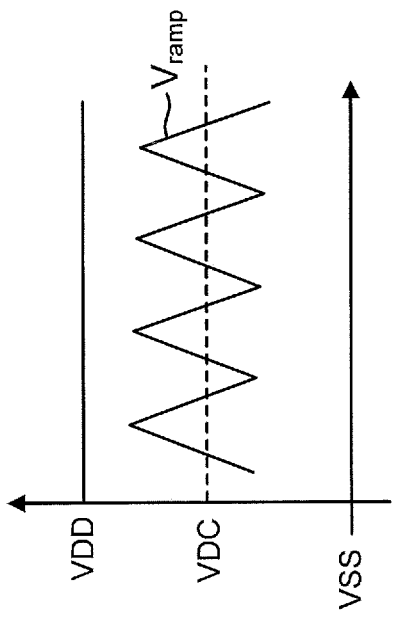
FIG. 2A illustrates the error voltage and the ramp voltage in the switch-mode power supply of FIG. 1 upon startup without any startup assistance.
Figure 2B:
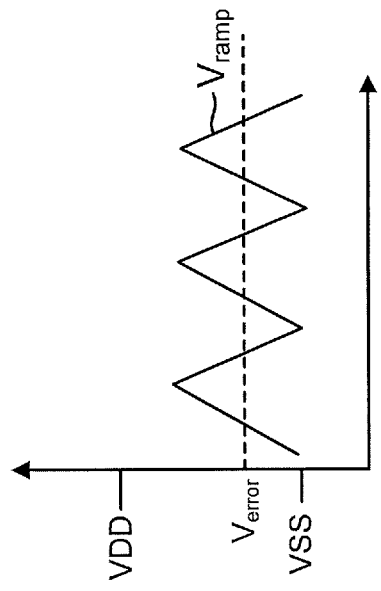
FIG. 2B illustrates the error voltage and the ramp voltage in the conventional switch-mode power supply of FIG. 1 after the control loop has been closed following startup assistance.

A synchronous ramp generator 135 generates a ramp voltage (Vramp) responsive to a clock signal. This ramp voltage may be as discussed with regard to FIG. 2A. Referring again to FIG. 2A, note that the ramp voltage has some average DC value (VDC). To filter out this DC value, ramp generator 135 drives a first terminal of a capacitor C that has a second opposing terminal coupled to an input 310 of comparator 110. Error amplifier 120 couples to comparator input 310 through a resistor R. Error amplifier 120 thus drives a first terminal of resistor R, which in turn has a second opposing terminal coupled to comparator input 310. In this fashion, a combined voltage (Vcombined) is produced at comparator input 310 that equals a scaled version of the error voltage added or combined with an DC-voltage-free version of the ramp voltage Vramp. A remaining input 315 of comparator 110 receives the reference voltage that also drives error amplifier 120. Comparator 110 thus compares the combined voltage to the reference voltage to produce the PWM controller output clock that controls power switch 105.

Upon startup, the error voltage may either equal the power supply voltage VDD or ground (VSS) as discussed with regard to conventional switch-mode power supply 100. In switch-mode power supply 100, this value for the error voltage is a stable operating point despite the presence of feedback. Its power switch 105 must then be cycled in an open loop mode of operation so that the PWM controller clock is pulsed and so that the control loop may be eventually closed. In sharp contrast, the power supply voltage VDD or VSS is not a stable operating point for the error voltage in switch-mode power supply 300. For example, suppose the error voltage at startup is grounded (equaling VSS). The DC-free addition of the ramp voltage to the error voltage to produce the combined voltage forces the combined voltage to ramp from ground as the ramp voltage from ramp generator 135 is ramped up from its DC value. At startup, a control circuit (not illustrated) controls a digital control signal driving DAC 130 such that the reference voltage ramps up from ground to its desired closed-loop value (this value depending upon what level is desired for the regulated output voltage). The result is that a sufficient intersection between the combined voltage and the reference voltage results such that the PWM controller clock is guaranteed to pulse power switch 105 upon startup. The same salutary effect results if the error voltage equals the power supply voltage VDD upon startup because as the ramp voltage falls below its DC value, the combined voltage is pulled down from VDD so that it intersects sufficiently with the reference voltage as the reference voltage ramps up to its desired operating level. Responsive to this intersection, the PWM controller output clock begins pulsing so that power switch 105 cycles accordingly. This cycling of the power switch 105 is processed through error amplifier 120 and comparator 110 in a closed loop fashion to force the duty cycle of the PWM controller output clock (and hence the duty cycle for power switch 105) to bring the output voltage from power storage element 115 into regulation. In one embodiment, the resistor and capacitor of switch-mode power supply 300 may be deemed to comprise a means for combining a direct-current (DC) voltage-free version of the ramp voltage with the error voltage to produce the combined voltage.

Due to the AC (DC-free) superposition of the ramp voltage onto the error voltage, it could be the case that the combined voltage is driven to a level such that it damages transistors in comparator 110. For example, if the error voltage equals the power supply voltage VDD upon startup, the initial AC superposition of the ramp voltage onto this value would boost the combined voltage above VDD to a potentially device-damaging level. To prevent such an increase, a voltage clamp circuit 305 may be used to clamp the combined voltage from rising above some maximum voltage level (Vmax) that would be set so as to guarantee the safety of devices within comparator 110. Voltage clamp 305 may comprise a diode (not illustrated) or other suitable clamping circuitry.

Figure 4A:
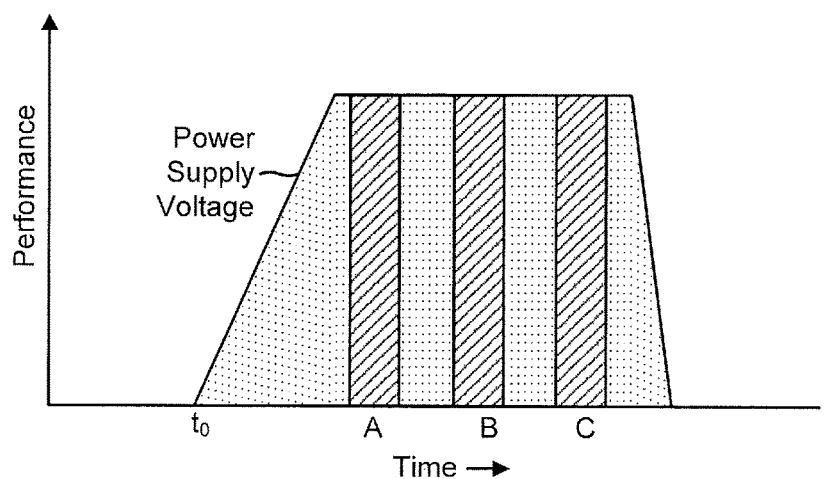
FIG. 4A illustrates the power supply waveform resulting from conventional control of the power supply voltage for a processor operated in bursts of activity.

Closed loop control or regulation of the output voltage begins at startup since the feedback loop through voltage scaling circuit 125, error amplifier 120 and comparator 110 is never broken. The output voltage may thus be brought into regulation much more quickly as compared to conventional startup techniques. This speed is quite advantageous with regard to saving power. For example, suppose the output voltage from conventional switch-mode power supply 100 is used as a power supply voltage on a power rail for a processor core that is only awakened for relatively brief periods or bursts A, B, and C as shown in FIG. 4A. Due to the delay required into bringing the power supply voltage into regulation, the startup of the conventional switch-mode power supply must begin well before the initial processor burst A at a time t0. But this is undesirable since the processor will discharge power through leakage currents as the power supply voltage slowly ramps up to its regulated value, whereupon the processor may begin processing burst A. Since subsequent burst B follows A by less than the ramp-up time for the power supply voltage, the power supply voltage must be maintained from burst A to burst B despite the lack of processor activity. This maintenance of the power supply voltage then continues to waste power through leakage currents despite the processor being idle. Similarly, burst C follows burst B by less than the power supply voltage ramp up time so the power supply voltage is also maintained in between bursts B and C, which continues to waste power through leakage currents accordingly.

Figure 4B:
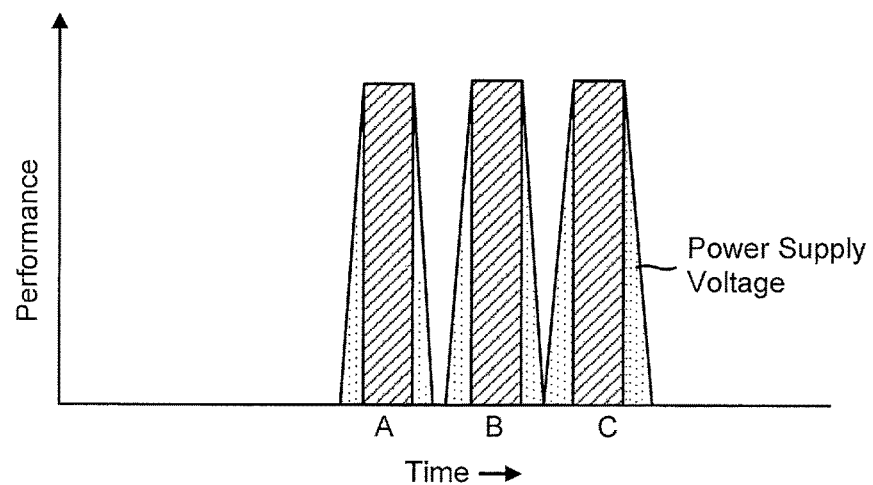
FIG. 4B illustrates the power supply waveform for the processor of FIG. 4A as produced by a switch-mode power supply in accordance with an embodiment of the disclosure.

Considerably less power is wasted if switch-mode power supply 300 may be used to produce the power supply voltage as shown in FIG. 4B. Due to the much faster ramp up time, switch-mode power supply 300 may start up just before processor burst A. The leakage currents during ramp up of the power supply voltage are thus sharply decreased as compared to the loss for the conventional power ramp up of FIG. 4A. Moreover, the power rail may be collapsed in between bursts A and B as well as between B and C since the power supply voltage may be quickly brought back into regulation prior to processor operation in bursts B and C. In contrast, the conventional PWM control used in FIG. 4A is too slow to allow the power rail to be collapsed in between the processor bursts of activity. The PWM control disclosed herein thus conserves power as compared to conventional approaches. Moreover, note that these advantageous results for switch-mode power supply 300 are obtained merely through a clever reordering of the comparator inputs as compared to conventional switch-mode power supply 100 and the addition of the RC circuit and optional voltage clamp. In contrast, conventional switch-mode power supply 100 requires complex circuitry (not illustrated) to accommodate its transition from open loop control at startup to the eventual closing of the feedback loop. Such circuitry is unnecessary in switch-mode power supply 300 as the feedback loop is closed upon startup. An example method of operation for a switch-mode power supply in accordance with an embodiment of the disclosure will now be discussed.

Figure 5:
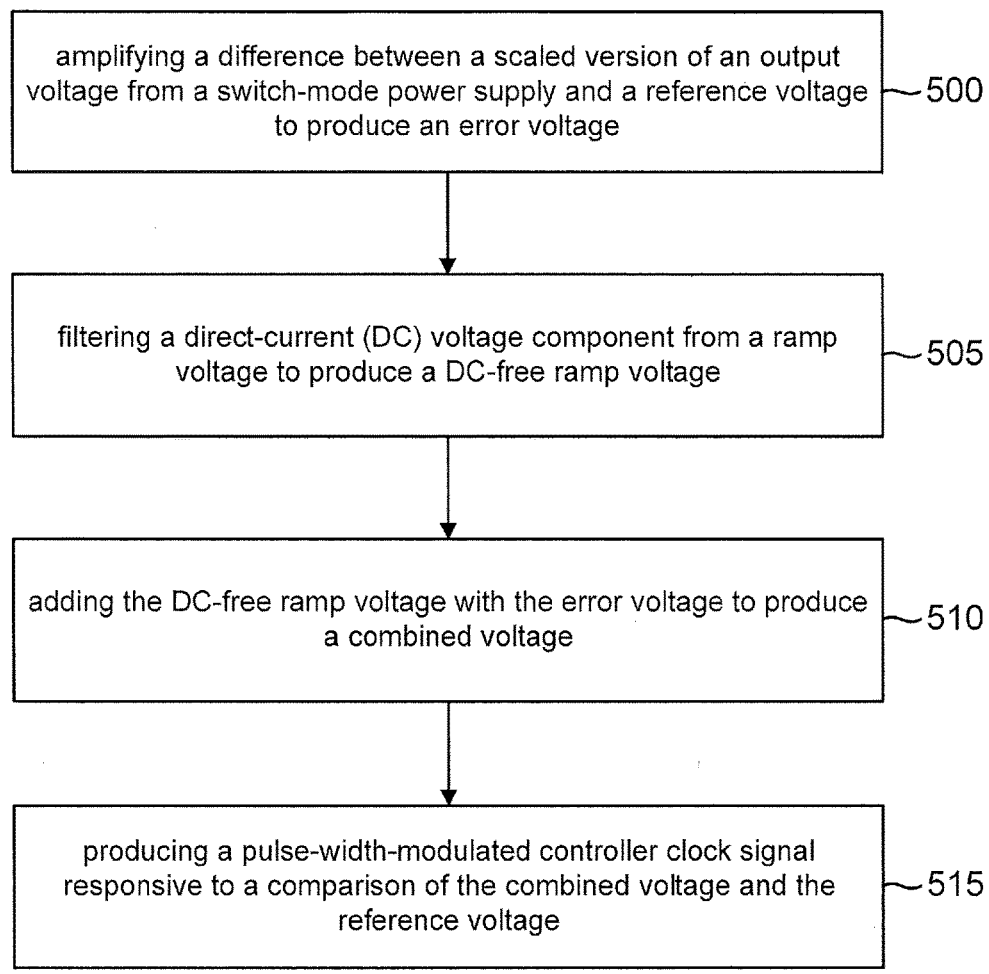
FIG. 5 is a flowchart for an example method of operation for a switch-mode power supply in accordance with an embodiment of the disclosure.

FIG. 5 is a flowchart for an example method of operation. The method includes an act 500 of amplifying a difference between a scaled version of an output voltage from a switch-mode power supply and a reference voltage to produce an error voltage. The production of the error voltage by error amplifier 120 in switch-mode power supply 300 is an example of act 500. The method also includes an act 505 of filtering a direct-current (DC) voltage component from a ramp voltage to produce a DC-free ramp voltage. The AC-coupling of the ramp voltage to comparator input 310 in switch-mode power supply 300 is an example of act 505. In addition, the method includes an act 510 of combining the DC-free ramp voltage with the error voltage to produce a combined voltage. The formation of the combined voltage at comparator input 310 in switch-mode power supply 300 is an example of act 510. Finally, the method includes an act 515 of producing a pulse-width-modulated controller clock signal responsive to a comparison of the combined voltage and the reference voltage. The production of the PWM controller clock by comparator 110 in switch-mode power supply 300 is an example of act 515.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A circuit, comprising
    an error amplifier configured to amplify a difference between a reference voltage and a scaled version of an output voltage for a switch-mode power supply to produce an error signal;
    a resistor having a first terminal configured to receive the error signal and having a second terminal;
    a ramp generator having a ramp output signal node coupled through a capacitor to the second terminal of the resistor; and
    a comparator configured to produce a pulse-width modulated (PWM) controller output clock responsive to a comparison of the reference voltage to a voltage for the second terminal of the resistor.

2. The circuit of claim 1, further comprising:
    a digital-to-analog converter configured to provide the reference voltage responsive to a digital control word.

3. The circuit of claim 2, further comprising:
a band gap reference configured to provide a band gap reference voltage as a power supply voltage to the digital-to-analog converter.

4. The circuit of claim 1, wherein the ramp generator is a synchronous ramp generator configured to be responsive to a clock signal.

5. The circuit of claim 1, further comprising a scaling circuit configured to scale the output voltage to form the scaled version of the output voltage.

6. The circuit of claim 5, wherein the scaling circuit comprises a voltage divider circuit.

7. The circuit of claim 1, further comprising a clamp circuit configured to clamp the voltage for the second terminal from rising above a maximum voltage level.

8. The circuit of claim 7, wherein the clamp circuit comprises a diode.

9. The circuit of claim 1, further comprising:
a power switch configured to be cycled on and off responsive to the PWM controller output clock.

10. The circuit of claim 9, further comprising a power storage element configured to process an input voltage into the output voltage, wherein the power switch is further configured to control a current in the power storage element.

11. The circuit of claim 10, wherein the power storage element is an inductor for a buck converter.

12. The circuit of claim 10, wherein the power storage element is an inductor for a boost converter.

13. The circuit of claim 10, wherein the power storage element is a secondary winding in a transformer for a flyback converter.

14. A method, comprising:
amplifying a difference between a scaled version of an output voltage from a switch-mode power supply and a reference voltage to produce an error voltage;
filtering a direct-current (DC) voltage component from a ramp voltage to produce a DC-free ramp voltage;
combining the DC-free ramp voltage with the error voltage to produce a combined voltage; and
producing a pulse-width-modulated controller clock signal responsive to a comparison of the combined voltage and the reference voltage.

15. The method of claim 14, further comprising:
generating the ramp voltage responsive to a system clock signal.

16. The method of claim 14, further comprising:
cycling a power switch in the switch-mode power supply responsive to the pulse-width-modulated controller clock signal.

17. The method of claim 14, further comprising clamping the combined voltage to prevent the combined voltage from exceeding a maximum voltage level.

18. A circuit, comprising:
an error amplifier configured to amplify a difference between a reference voltage and a scaled version of an output voltage for a switch-mode power supply to produce an error amplifier voltage signal;
means for combining a direct-current (DC)-free version of a ramp voltage with the error amplifier voltage signal to produce a combined voltage; and
a comparator configured to produce a pulse-width modulated (PWM) controller output clock responsive to a comparison of the reference voltage to the combined voltage.

19. The circuit of claim 18, further comprising:
a power switch configured to cycle on and off responsive to the PWM controller output clock.

20. The circuit of claim 18, further comprising:
a synchronous ramp generator configured to provide the ramp voltage responsive to a system clock.

* * * * *